Feb. 20, 1962   LA VERN G. SOPER ET AL   3,022,411
BEVERAGE MAKER
Filed Sept. 16, 1958   4 Sheets-Sheet 2
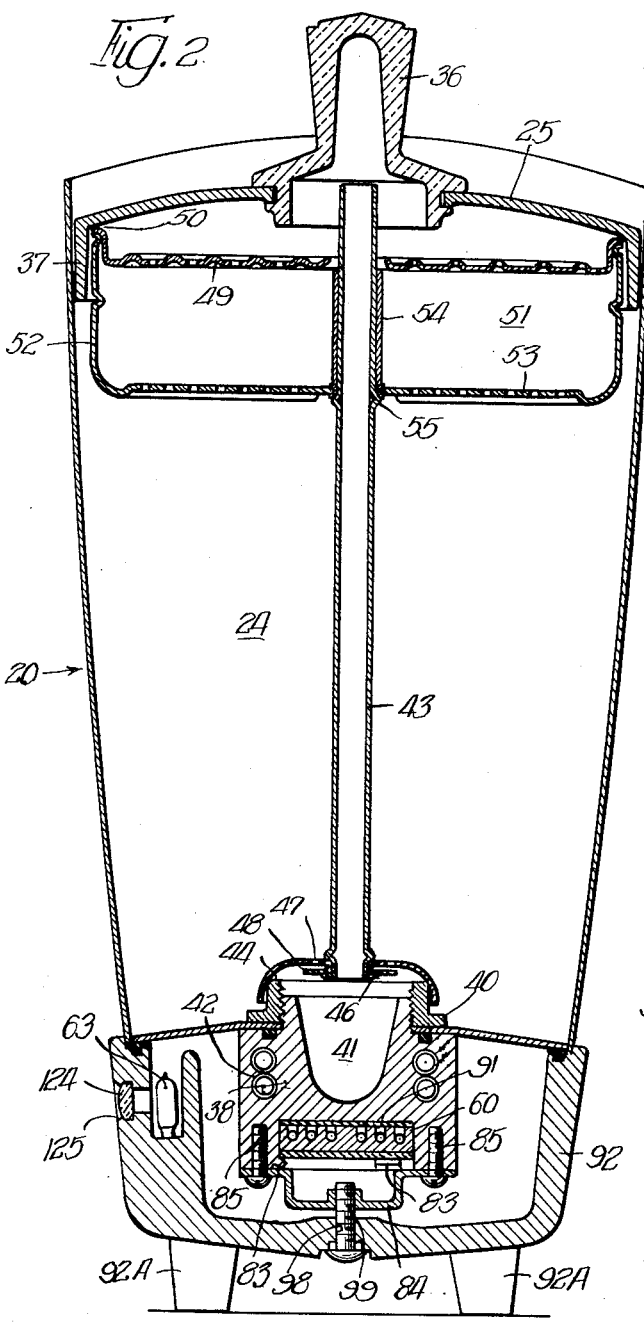
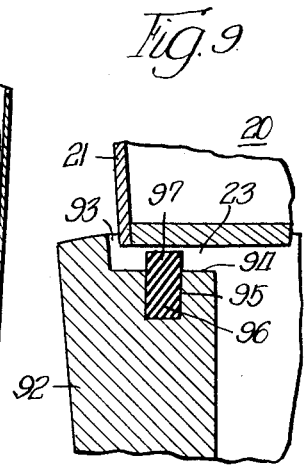
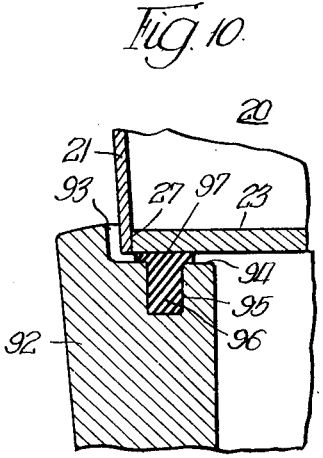
INVENTORS.
LaVern G. Soper,
Lee M. Harris,
BY Brown, Jackson, Boettcher & Dienner
Attys

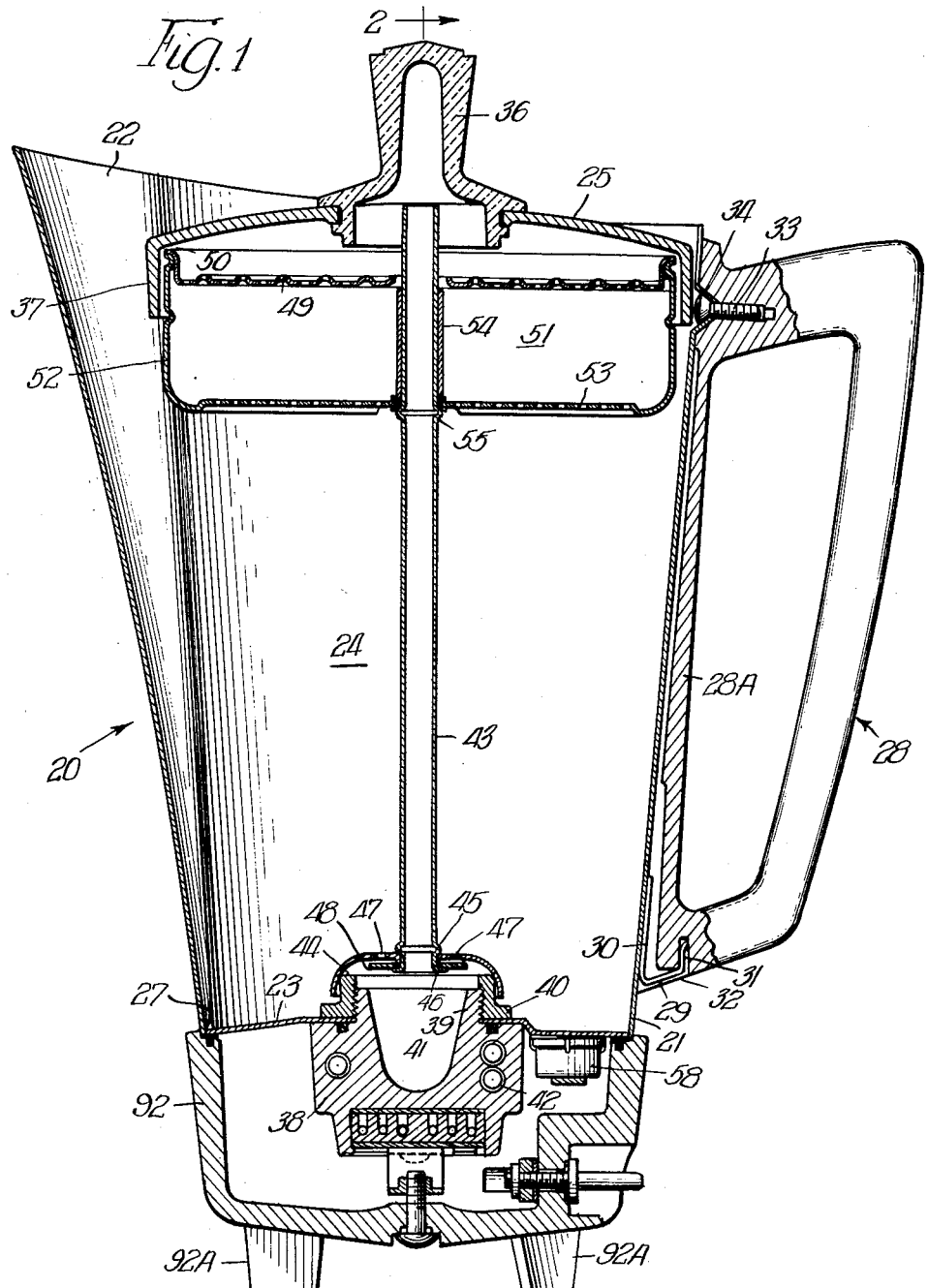

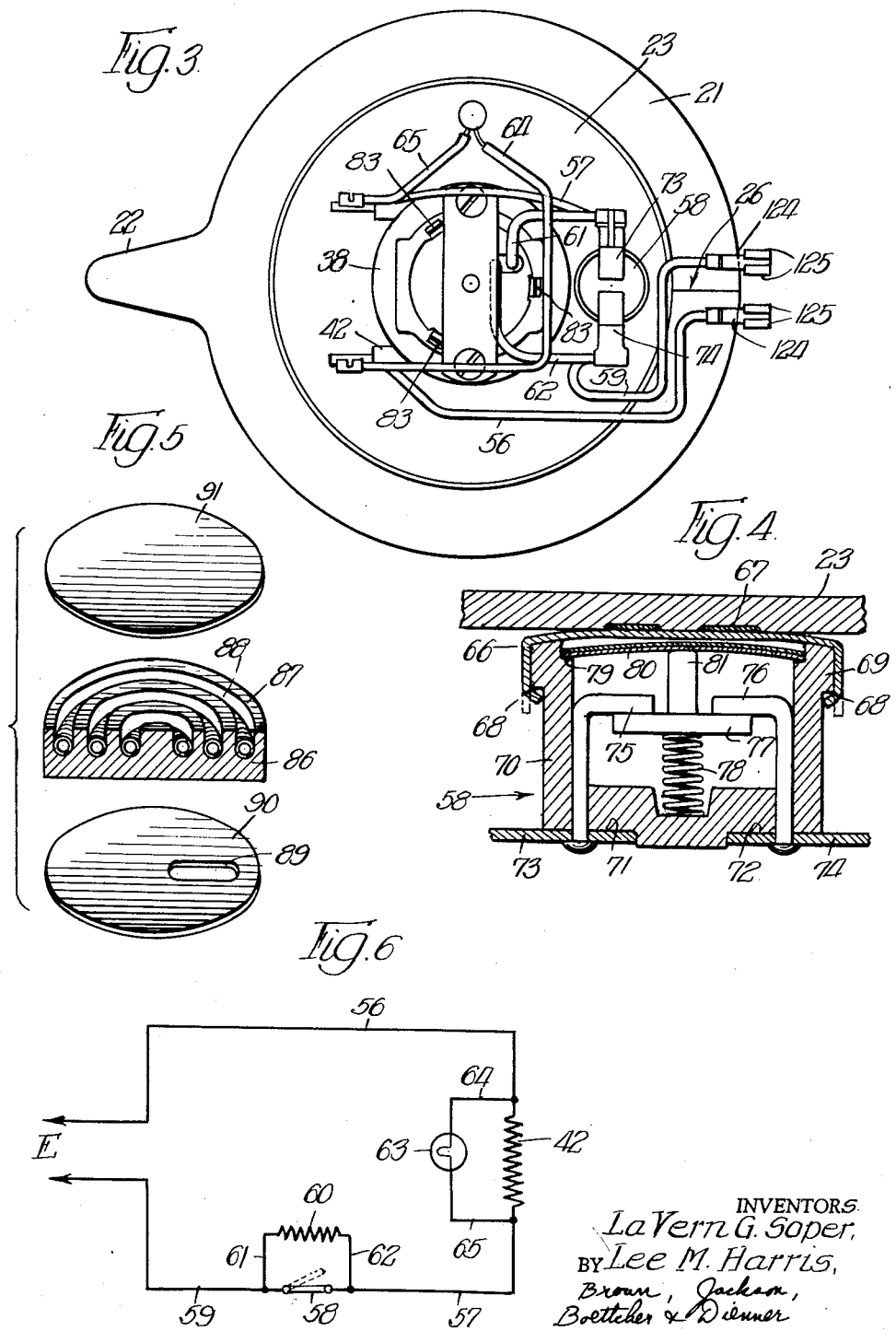

Feb. 20, 1962 LA VERN G. SOPER ET AL 3,022,411
BEVERAGE MAKER
Filed Sept. 16, 1958 4 Sheets-Sheet 4
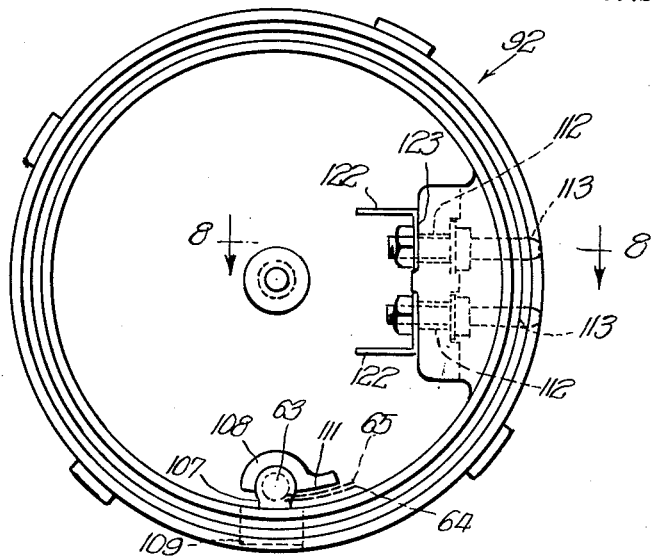
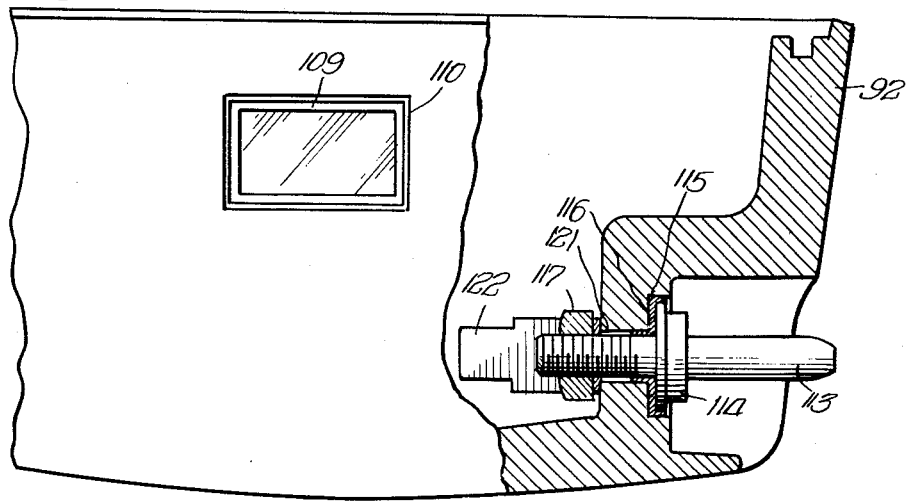
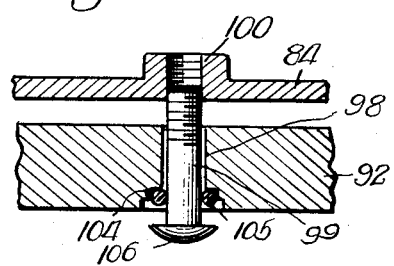
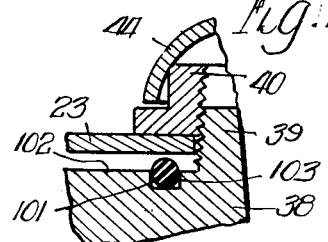
INVENTORS.
La Vern G. Soper,
Lee M. Harris,
BY Brown, Jackson, Boettcher & Diemer
attys

United States Patent Office 3,022,411
Patented Feb. 20, 1962

3,022,411
BEVERAGE MAKER
La Vern G. Soper and Lee M. Harris, Eau Claire, Wis., assignors to National Presto Industries, Inc., Eau Claire, Wis., a corporation of Wisconsin
Filed Sept. 16, 1958, Ser. No. 761,318
5 Claims. (Cl. 219—44)

This invention relates to devices used in brewing a beverage such as coffee and more particularly to such devices having self-contained means for thermostatically controlled electrical heating as when connected to an external source of electrical power.

A principal object of the invention is to provide an electrically operated coffeemaker or other beverage brewing device which may be completely immersed in water as to enable satisfactory cleaning thereof.

A more specific object of the invention is to provide a beverage maker having thermostatically controlled electrically operated heating means sealed within the base thereof such as to permit its complete submerging into water without risking injury to the controls and/or mechanisms embodied therein.

Still another object of the invention is to provide such a device which will also be economical and practical to produce from a manufacturer's point of view as well as being of a construction convenient to disassemble and repair, when and if necessary.

Another object of the invention is to provide a coffeemaker or other beverage maker having all of the aforesaid features and/or advantages while also being of a construction convenient to use and easy to keep clean.

In keeping with the previously recited more general objects of the invention, the invention further contemplates a coffeemaker or other beverage brewer having a novel and unique, functionally useful shape of cooking well and pouring spout; having a novel and distinctive arrangement for removably seating a cover within the open top of the cooking well, and a novel manner of attaching a handle to its body whereby not only is the attachment means out of sight but is also insulated by the handle.

Still other objects of the invention include a novel arrangement of percolator well, pump and heating elements in a coffeemaker; also a novel arrangement and mounting of the components of the electrical system of an electrically heated coffeemaker on the bottom wall thereof; also a protective cap or cover therefor which can be conveniently assembled with and/or removed from about said components without disturbing the arrangement thereof; as well as a novel construction of and/or means of assembling and sealing said cap over and about the electrical components so as to provide protection therefor against moisture.

Many other objects, advantages and/or features of a coffeemaker and/or other heating device constructed according to the invention are or will become apparent from the detailed description of one embodiment of the invention which will now be described.

Referring to the drawings:

FIGURE 1 is a vertical sectional view taken through a coffeemaker embodying the present invention and is shown with the electrical wiring removed;

FIGURE 2 is a sectional view taken along lines 2—2 through the coffeemaker illustrated in FIGURE 1;

FIGURE 3 is a bottom end view of said coffeemaker with the base or protective cap removed to show the arrangement and/or manner in which the heating elements and electrical controls therefor are mounted on the bottom of the coffeemaker body;

FIGURE 4 is an enlarged fragmentary view in section showing details of the thermostatic control device;

FIGURE 5 is an exploded view partly in section to show details of the warming element;

FIGURE 6 is a schematic view of the electrical circuit;

FIGURE 7 is a top plan view looking down into the base when separated from the coffeemaker;

FIGURE 8 is a fragmented side elevational view of said base with a portion thereof cut away and illustrating a terminal post sealed in assembled relation therewith;

FIGURE 9 is a fragmentary sectional view showing the shape of the sealing ring between the base and body of the coffeemaker immediately prior to being compressed into sealing relation;

FIGURE 10 is a similar view but with the coffeemaker drawn into the receiving recessed edge of the base and showing the T-shape to which the sealing ring is compressed;

FIGURE 11 is a fragmentary sectional view showing the mode of attaching the base to the coffeemaker body; and FIGURE 12 is a fragmentary sectional view to illustrate the manner of sealing used between the casting which forms the percolator well and the bottom wall of the coffeemaker.

Now referring more specifically to the several views wherein like parts are identified by like reference numerals, and first to FIGURE 1, the invention is shown embodied in a coffeemaker comprising a main body 20 having a side wall 21 of inverted generally frusto-conical shape and an integrally related pouring spout 22, said sidewall 21 with bottom wall 23 forming a well area 24 having an open top for filling and which is closed by cover 25. The body of the illustrated coffeemaker is conveniently formed from flat stainless steel sheet stock or other suitable metallic material by blanking out therefrom the developed shape of the body, including the integral spout 22. Spout 22, as seen in FIGURES 1 and 3 has a generally tapered shape and extends almost the entire vertical length of wall 21. It is formed integrally with sidewall 21 by deforming the central portion of the afore-mentioned blank to the illustrated tapered shape as between suitable male and female dies, after which the blank is curled into the illustrated generally frusto-conical shape of the coffeemaker body so that the well 24 of the coffeemaker has its smaller diameter adjacent the bottom and which progressively increases in dimension toward the top to permit more effective heating of the contents. The meeting edges of wall 21 are brought together and welded as at back seam 26 (FIG. 3). Annular member 23 which forms the bottom wall of the well 24 is also stamped and cut from similar sheet stock to its required shape and is then welded about its outer circumference to the lower peripheral edge of wall 21 to form seam 27 (FIG. 10). The thus formed body 20 is then finished as by grinding and polishing its exposed surfaces particularly any roughness apparent at welded seams 26 and 27.

The coffeemaker is also provided with a handle which is indicated generally at 28 and has a vertical base portion 28A which is positioned to substantially completely cover the back seam 26. Although said handle 28 may be attached to the coffeemaker wall in any convenient manner, we provide a hook-like member 29 having a part 30 which we weld to the coffee maker wall 21 and an upstanding tongue portion 31 which is spaced from welded portion 30 and fits into a recessed portion 32 of the handle 28 to support the lower end thereof. To complete connection of the handle 28 to wall 21, we threadedly connect a screw 33 into the upper portion of the handle 28, from interiorly of the coffeemaker body. Handle 28 is thereafter readily removable by removing screw 33 but is at the same time positively held in place by said single screw 33 in cooperation with member 29. Moreover said connection means 29 and 33 are not only concealed from view but they are also heat insulated and sheathed by the portion 28A of the handle so that one in grasping the handle 28 does not bring his hand into contact therewith. Wall 21 is further recessed at 34 to permit the head of screw 33 to be located flush with the inner surface of the coffeemaker wall 21 so that it will not interfere with the insertion and removal of cover 25 from within the open top of well 24 of said coffeemaker.

The open top of the well 24 is enclosed by the aforementioned removable cover 25 and which cover has surmounted thereon a centrally disposed hollow knob 36 formed of glass or of transparent plastic. Although cover 25 may be formed of any suitable material, as for example stainless steel, we prefer to form the same of a rigid shape retaining plastic such as phenolic resin and to provide said cover with a depending cylindrically-shaped integral flange part 37 which we dimension so that it may be positioned within the open top of well 24 below the level thereof and achieve a frictional fit when forced, with slight downward pressure, into the out-of-round, more resilient coffeemaker body. The rigid flange part 37 is of generally cylindrical shape so that when it is forced into the open top of the coffeemaker body, it engages the tapered or conical shaped smooth inner side surface of wall 21 causing said wall 21 to spring into the shape of the flange 37 to obtain said friction catch of the cover therewith.

Suspended from bottom wall 23 of the coffeemaker is a casting 38 having an externally threaded reduced portion 39 which protrudes upwardly through a central disposed opening provided in said annular shaped bottom wall 23 and over which is threadedly connected lock nut 40 which holds the casting in connected relation with said bottom wall 23. As seen best in FIGURE 12 casting 38 has a recess 101 in its upper surface 102 encircling threaded portion 39 in spaced relation thereto and in which we locate an O-ring 103 of high temperature resistant thermosetting material such as silicone rubber. A portion of this O-ring extends above surface 102 so that as lock nut 40 is tightened on portion 39, the effect is to compress the protruding portion of O-ring 103 against the underside of wall surface 23 about the opening therethrough to assure a leak proof connection between wall 23 and casting 38 will be obtained. Said casting 38 includes a hollowed-out area or percolating well indicated generally at 41 which opens into the interior of well 24 to receive fluid therefrom for heating. For this purpose casting 38 further contains a tubular main heating element 42 cast in the material thereof and located to surround, in spiraling fashion, well 41. Over said well 41 is removably located a bell shaped member 44 which is secured at the lower end of a hollow stem 43 between radial flange 45 struck from the stem and the outwardly flared end 46 thereof. The said bell shaped member 44 has an entrance through said connection into the hollow interior of stem 43 and forms therewith a percolating pump through which water, as it is heated in well 41 to percolating temperature, is forced from well 41 vertically the length of the stem 43, and spilling over the upper end thereof so as to be distributed over ground coffee disposed in a basket 51 supported adjacent the upper end of the stem 43 by means of a second radial flange 55 struck from stem 43. Member 44 is also provided with openings 47 which are spaced peripherally about its connection with the stem 43 to permit entrance of water from well 24 into percolating well 41. Cooperatively associated with said openings 47 is a flutter valve comprising an annular disc 48 loosely mounted between the aforementioned flared end 46 of stem 43 and the underside of the upper portion of said bell shaped member 44. Disc 48 normally rests under the action of gravity against flared end 46 permitting water to enter well 41 through openings 47. However as the temperature of the water within the percolating well 41 is increased by energization of heating element 42 to where the resultant increased pressure beneath bell shaped member 44 is sufficient to drive the water out of well 41, flutter valve disc 48 is raised simultaneously to cover opening 47 and so that the heated water exits only through stem 43. Subsequently as the pressure in the percolating well lowers by reason of the water exiting through stem 43, the valve disc 48 falls back against flared end 46, permitting more water to enter through openings 47 to continue the process.

To permit more uniform distribution of the percolating water which spills over the upper end of stem 43, the coffee basket 51 is provided with a perforated lid 49 having a flange part 50 resting on the peripheral edge of wall 52 of the coffee-basket and which receives the spilled water and directs it at a controlled rate over the ground coffee contained in the coffee basket to obtain maximum contact therewith. The coffee basket 51 in addition to having an outer peripheral wall 52 also has an inner wall 54 forming a cylindrically shaped opening through which the stem 43 extends and which serves to align the basket on stem 43 as well as more effectively containing the ground coffee. The bottom wall of the basket is also provided with relatively fine holes 53 through which the coffee fusion is returned to well 24 and thence to percolating area 41 for further heating.

In order to keep the coffee warm once it has been sufficiently percolated, the described coffeemaker is provided with a warming element indicated generally at 60 and which is energized only on deenergization of the percolator heating element 42 under the control of thermal switch 58.

Referring now to FIG. 6 it will be seen that the percolator heating element 42 is connected by wire 56 to one side of an external source of electrical power E and is connected to the other side of said power source E by wire 57, normally closed switch 58 and wire 59 to form a complete electrical circuit. Connected in said circuit in parallel with normally closed switch 58 by wires 61 and 62 is the mentioned warming element 60. An indicating lamp 63 is also preferably connected in said circuit in parallel with the main heating element 42 by means of wires 64 and 65. The operation of the circuit is as follows: Normally closed switch 58, the construction details of which will be later described, is located in proximity to the bottom wall 23 of the coffeemaker and is adjusted to open only when the temperature of the water within the percolating well 41 reaches a predetermined level indicating that coffee has been brewed by heating element 42 to the proper strength. It does not thereafter again close until the circuit has been disconnected from the power source E or conditions have been reduced to near room temperature or below. Preferably heating element 42 is a 500 watt element of relatively low electrical resistance while warming element 60, although of relatively low wattage (near 40 watts), is of much higher electrical resistance, so that when switch 58 is in its normally closed position, the resistance of heating element 60 will effectively block the flow of electrical energy therethrough and current will preferentially flow through the switch so that heating element 42 is alone energized. Simultaneously therewith, indicating lamp 63 which is also of lower resistance is simultaneously energized by the passage of current to show that the coffee is being heated to the percolating stage. However, when the predetermined temperature of the water has been reached for which control switch 58 has been adjusted, it opens. At that moment warming element 60 necessarily becomes a part of the operating circuit and, because of the high resistance of element 60, the current flow becomes so low that the heating element 42 does not heat and the indicating lamp 63 goes out, indicating that the coffee is brewed and ready for serving. Warming element 60 thereafter functions to keep the brewed coffee at a temperature suitable for drinking.

Referring now to FIGURE 4, thermal control switch 58 is shown as including an outer shell 70 which contains the operating mechanism of the thermo switch and a cover or mounting part 66, formed of heat transferable or conductive material such as stainless steel. Said cover 66 is welded as at 67 to bottom wall 23 of the coffeemaker body so as to be in heat conductive relation with fluid contained therein and when shell 70 is located within said cup 66, its edge portions 68 are crimped over and about a ledge 69 provided on the shell 70 to removably support the thermostat adjacent said bottom wall 23 where it will be influenced by temperature changes in said bottom wall. Shell 70 may be formed of phenolic resin or other electrical and heat insulating material. Mounted on the bottom wall of said shell 70 within appropriately provided recesses 71 and 72 are a pair of diametrically opposed outwardly extending plate-like terminal members 73 and 74 which are eletcrically connected at their outer ends to wires 59 and 57 and adjacent their inner ends to a pair of fixed contacts 75 and 76 which are disposed interiorly of shell 70 and in spaced relation to each other. Movable contact member 77 under the urging of compressed spring 78 serves to effect a normally closed electrical connection therebetween to complete the circuit to the heating element 42 and effect a by-passing of warming element 60. Positioned in spaced relation over said contacts and having its outer edge seated in an appropriate recess 79 is a bi-metal disc 80 normally cupped in a direction away from said contacts. Centrally of said bi-metallic disc 79 is located an operating member 81 which is held thereby in engagement with movable contact 77. As the temperature of the water within well 24 is raised, heat therefrom is transferred through bottom wall 23 of the coffeemaker and connecting cover 66 to the bi-metal element 79 which when heated to a predetermined temperature reverses its cupped form, forcing part 81 downward and moving contact 77, against the action of compression spring 78, out of engagement with contacts 75 and 76 and thus to interrupt the circuit which has the effect aforementioned of energizing element 60 and de-energizing element 42 and lamp 63. Disc 79 is further so adapted that it will not again return to its original cupping until cold.

Referring now to FIGS. 1, 2 and 5, the warming element indicated generally at 60 is seated within a cavity 82 on the underside of casting 38 where it will influence the water contained in percolator well 41 through conductive heating of casting 38. As seen best in FIG. 5 said disc-like member 60 comprises a main ceramic circular body 86 having a spirally arranged recess on its upper side in which is contained a coiled Nichrome heating wire element 88. The terminal ends (not shown) of said element are connected to wires 61 and 62 which communicate therewith through slot 89 provided in a supporting steel cover disc 90 on the underside of the ceramic body 86 and which is appropriately staked into the casting 38 as by means 83. Preferably recess 87 is filled with a ceramic cement which completely covers element 88 and a disc 91 of insulating material such as mica is disposed over said recessed side of body 86 and so as to lie therebetween and the base of the recess 84 in casting 38.

It will of course be understood that the form of thermostatic control switch 58 and heating elements 42 and 60 shown and described are merely illustrative of elements which might be effectively used in accordance with the invention and furthermore that any other desired construction of control switch and/or heating elements could be utilized if adapted in accordance with the teachings of the invention herein described and claimed.

In order to permit the coffeemaker to be completely submerged in water as is necessary to satisfactorily wash the same, the casting 38 containing the two heating elements 47 and 60, the thermo switch 58 and the other electrical components of the circuit, such as wiring, are completely enclosed and otherwise concealed by a cover 92 formed of heat and electrical insulating plastic such as phenolic resin. Cover 92 preferably will be formed by compression or transfer molding to the required shape and which includes a plurality of legs 92A integrally formed therewith to provide means by which the coffeemaker can be stably supported on a given surface.

One of the important features of the present invention is the novel means provided for effecting a moisture proof seal between the cover 92 and the body 20 of the coffeemaker and which means also permits convenient removal of the cover for inspection and/or repair of the electrical components and its reassembly therewith. Referring to FIGS. 9 and 10, the upper peripheral edge of the cover 92 is shown as provided with an inner recess 93 on its inner side which receives the lower edge of coffeemaker body 20. In base 94 of said recess 93 is located a circumferentially extending groove 95 containing an O-ring 96 which may be of silicone rubber or other resilient heat resistant material. Said ring 96 is preferably of a generally rectangular cross sectional shape (FIG. 9) which corresponds to the shape of groove 95 so as to fit snugly therein and further has a portion 97 thereof which extends above surface 94 to intimately engage the adjacent peripheral edge of the bottom wall 23 of the coffeemaker body 20 when cover 92 is secured to the coffeemaker in the manner now to be described. For this purpose, cover 92 has a centrally disposed opening 98 (FIGS. 2 and 11) through which connecting screw 99 extends for threaded connection into a threaded opening 100 formed in bracket 84 secured to casting 38 as by screws 84. As screw 99 is threaded inwardly of opening 100 to secure cover 92 to the coffeemaker, the effect is to draw the lower peripheral edge of the coffeemaker body 20 into recess 93 and against portion 97 of the O-ring 96 compressing it against the underside of bottom wall 23 and causing the ring 96 to assume a substantial T-shape as illustrated in FIG. 10 and to provide an effective water-proof seal therebetween.

Cover 92 is also recessed as at 104 (FIG. 11) about opening 98. In said recess 104 is disposed a further O-ring 105 also of silicone rubber. This further ring 105 is simultaneously compressed between the bottom wall of said recess 104 and head 106 of said connecting screw 99 as the screw is tightened so to effect a water proof seal in this region also.

Turning now to FIGURES 7 and 8, cover 92 has an integrally molded shelf-like portion 107 including an upstanding wall 108 which provides a restricted space between it and the inner surface of cover 92 in which the lamp 63 may be conveniently located and held relatively immobile in front of window 109 which is water proofedly cemented in a recess 110 provided therefor in cover 92 and through which light from lamp 63 will be plainly visible when illuminated. Said wall 108 is also recessed at 111 to accommodate lead wires 64 and 65 thereto.

Cover 92 is further provided with a pair of appropriately spaced openings indicated at 112 through which a pair of terminal pins 113 extend. These pins 113 include a flanged part 114 which seats in a suitable recess 115 provided in the material of cover 92 about each of openings 112. Between said flanged part 114 and the bottom wall of recess 115 is provided a third O-ring 116 of silicone rubber which is compressed therebetween by tightening of lock nut 117 on the inner exteriorly threaded end of said terminal pins 113. As the terminal pin is drawn inwardly to compress the silicone rubber ring 116 between its flanged part 115 and the inner wall of recess 121 some of the silicone rubber will also be extruded within any space which exists between the wall 121 of the opening 112 through which the terminal pin 113 extends to effect a completely water-proof sealed connection of the terminal pins within the cover 92. Electrically connected to the inner end of said terminal pins 113 are L-shaped connectors 122 having a part 123 which is disposed between lock nut 117 and the inner wall of cover 92 so as to form a positive electrical connection with the respective terminal pins 113 by tightening of lock nut 117. Said connectors 122 serve as means to which wires 59 and 56 may be respectively connected, said wires 59 and 56 having clamps 124 with bendable fingers 125 which may be pressed about respective connectors 122 to obtain a removable but positive electrical connection therewith. The outer ends of the terminals 113 are adapted for attachment to the plug of a conventional cord set (not shown) which in turn is connectable to a source of electrical power to permit energization of the aforedescribed electrically operated heating circuit of the coffeemaker.

Another of the important features of the illustrated construction is the arrangement of the electric controls and cover therefor whereby not only are the controls adequately protected against moisture contact, but also whereby the components of the electrical heating circuit are accessible for convenient repairing and/or checking of the same. As previously described, cover 92 is held in place by a single means constituting screw 99 which when loosened permits removal of the cover from about the electrical controls whereupon clamps 124 may be conveniently separated from the L-shaped terminal connectors 122 by merely loosening the friction fit of their fingers 125 about part 122 so that the cover 92 with its terminal pins can be completely dismounted from the coffeemaker but with the electrical circuit otherwise left completely intact.

With the cover thus removed, all the operating controls including the two heating elements, thermostatic control switch, indicating lamp and all of the wiring are exposed in their normally connected assembled relation on the coffeemaker while the disconnected terminal connectors 124 provide means for connection to appropriate test power leads. Thereupon the coffeemaker circuit and its parts may be test operated without the cover as for checking or any other purpose. The cover may be thereafter reassembled by merely attaching connectors 124 to their respective L-shaped terminals 122 and positioning lamp 63 in its provided space 107 before window 109 with its leads 64 and 65 in slot 111 as the receiving recess of cover 92 is located about the bottom of the coffeemaker 20. Screw 99 may be then inserted through opening 98, threaded into opening 100 and tightened to effect the desired connection and sealing of the parts against possible moisture damage.

From the above description it will be apparent that all of the objects of the invention have been demonstrated as being conveniently obtainable in a suitable and practical manner.

Thus having described our invention, we claim:

1. In a coffeemaker, an open-top container of generally inverted frusto-conical shape having a handle along one side and a circular cover including a cylindrically shaped flange-like part with a smooth outer surface which is flush with the periphery of the cover and sized to be less than the diameter of the open top of the container at its upper edge, said cover extending within the open top of the container below the upper edge of said container and its flange-like part having frictional fit with the inner surface of the wall of the container to close the open top thereof, a longitudinal portion of the side of said container opposite to the handle being deflected out of said frusto-conical shape to constitute a tapered pouring spout integral with said wall which extends from adjacent the bottom of said container to the upper edge of said container, said tapered pouring spout having its upper end as a continuation of the upper edge of the container and extending outside the limits confined by the cover, said spout further having uninterrupted full communication along its length with the interior of the container.

2. In a coffeemaker, an open-top container having a sidewall formed of one-piece sheet material and of generally inverted frusto-conical shape, said container seating on a separable supporting base containing electrically operated controls therefor, a handle extending lengthwise of said sidewall, a circular cover including a cylindrically shaped flange-like part, said cover seating within the open top of the container below the upper edge of said container and provided with a depending flange which is flush with the periphery of the cover and has frictional fit with the adjacent inverted frusto-conical shaped wall to close the same, a longitudinal portion of said sidewall opposite to that provided with the handle being deflected outwardly and forming a tapered pouring spout integral with said sidewall and having its upper end as a continuation of the upper edge of the container, the upper edge of said pouring spout extending outside the limits closed by the cover, and said spout further having uninterrupted full communication along its length with the interior of the container.

3. In a beverage brewer, comprising a fluid container having a water-tight bottom wall, electrically operated heating means supported by said container beneath its said bottom wall for heating fluid within said container, an electrical circuit including a pair of leads for connecting said heating means with a source of electrical power, thermostatic control means electrically connected into one of said leads for controlled energization of the heating means, said thermostatic control means being in thermal sensing communication with the bottom wall of the container, the improvement wherein both said heating means and thermostatic control means are disposed entirely inwardly of the outer margin of said bottom wall, and a cup-shaped cover member sized to approximate said bottom wall and having a peripheral portion overlying the outer margin of said bottom wall for enclosing said heating means, thermostatic control means and electrical circuit means, said cover member having a pair of outwardly projecting terminal posts water-proofedly mounted in a wall thereof, said terminal posts having inner ends extending through said wall of the cover member whereby they may be connected to said leads of the electrical circuit means, the peripheral portion of said cover member having a recess which opens toward the outer margin of said bottom wall and having an overlying wall, a heat resistant compressible sealing ring disposed within said recess and engaging said outer margin of the bottom wall of the container, the cover member having a centrally disposed opening and a communicating recessed area about said opening, a headed connection pin having a stud portion extending through said opening, a second heat-resistant compressible sealing ring disposed in said recessed area between the head of said pin and the bottom wall of the recessed area, a bracket carried by said container beneath its said bottom wall, and said connection pin having its stud portion drawn into connected relation with said bracket and compressing said two sealing rings to effectively seal the interior of the cup-like member against moisture penetration whereby said container can be completely immersed into water for cleaning purposes without risk of water entering said cup-like cover and injuring the heating means, thermostatic control means and electrical circuit means enclosed thereby.

4. In an electrically heated vessel comprising a container having a water-tight bottom wall, a surrounding wall provided with a pouring spout, an open top, and a closure for said open top, said container having heating means and a thermostatic switch therefor mounted on its said bottom wall, the improvement wherein the thermostatic switch is self-contained and it and said heating means are disposed entirely inwardly of the peripheral margin of said bottom wall, and a removable cup-like member is provided having an integral bottom and continuous sidewall disposed over said bottom wall and enclosing an area thereof containing said heating means and thermostatic switch, said cup-like member having a pair of terminals extending through its said sidewall and waterproofedly sealed therein, said terminals having outer ends adapted for connection to a cord set, and flexible connectors electrically connecting the thermostatic switch and heating means to the inner ends of said terminals, said cup-like member further having the peripheral portion of its sidewall overlying the outer margin of said bottom wall and provided with a continuous recess which opens toward the outer margin of said bottom wall of the container and has a wall in overlying relation therewith, a first annulus of heat resistant resilient material confined in said recess between said wall of the recess and the outer margin of the bottom wall of the container, the bottom of said cup-like member also including a central opening and having a communicating recessed area about said opening, connecting means including a stud portion extending through said opening for detachably connecting said cup-like member to said bottom wall, and a second annulus of heat resistant resilient material confined within said recessed area between its walls and said stud, said cover being drawn toward the bottom wall of the container by said connection means sufficiently to compress said last-mentioned annulus into intimate sealing contact between the walls of the recess and the stud portion and to simultaneously compress said first-mentioned annulus into sealing relation between the overlying wall of the first recess and the outer margin of said bottom wall, said cup-like member being otherwise imperforate and effectively sealing said heating means and switch against water contact during complete immersion of the coffee maker, said cup-like member being conveniently removable to expose said heating means and thermostatic switch therefor without disturbing the physical location and electrical connections thereof on the bottom wall of said container.

5. In an electrically heated coffee maker comprising a first well-forming member having an open top and a cover therefor, a bottom wall with a central opening therethrough and a surrounding wall formed with a pouring spout and having a handle for convenience in manipulating the coffee maker, a second well-forming member of heat conductive metal water-proofedly secured in said central opening in the bottom wall of said first member and depending therefrom, means for controlling the entrance of fluid from the interior of said first member into the well of said second member and for directing the return of heated fluid therefrom to the interior of said first member, and heating means supported on the underside of said bottom wall including a main heating element which surrounds the well of said second member, an auxiliary heating element, and a thermal switch mounted on the bottom wall of the first member so as to be influenced by the temperature of fluid contained in said first well-forming member, said switch means being disposed in an electrical circuit connected to said heating elements to control energization thereof, the improvement wherein said switch means is self-contained and it and the main and auxiliary heating elements are arranged entirely inwardly of the outer margin of the bottom wall of said first well-forming member, and a base on which said first member sets, said base having terminal posts protruding through a wall thereof and sealingly fixed therein, and means by which the inner ends of said pins are detachably connected to the electrical circuit comprising said heating elements and switch, the outer ends of said pins being adapted for connection to a source of electrical potential, said base serving as a cover to enclose said heating elements and terminal switch and having a circumferential continuous recess adjacent its outer edge, said recess being open toward said outer margin of the bottom wall of the first member and having an overlying wall, and an annulus of heat resistant resilient material confined by said overlying wall of the recess and having continuous engagement with the outer margin of said bottom wall, said base having a central opening and a communicating continuous recess thereabout, a second annulus of heat resistant resilient material in said communicating recess, and connection means including a stud portion extending through said central opening of the base and connected to said bottom wall, said cover being drawn by said connection means toward the bottom wall of the first member sufficient so as to sealingly compress the first annulus between the overlying wall of the first recess and the outer margin of said bottom wall and to simultaneously compress the second annulus between the walls of the recess about said stud portion and said stud portion, said base being otherwise imperforate whereby said heating elements, thermal switch and electrical circuits therefor are sealed against water penetration, and said base being conveniently separable from the bottom wall by loosening of said connection means to withdraw the cover and permit access to said heating elements, switch and circuits without disturbing their physical arrangement and electrical connection.

References Cited in the file of this patent

UNITED STATES PATENTS

| | | |
|---|---|---|
| 1,185,673 | Hughes | June 6, 1916 |
| 1,191,426 | Hughes | July 18, 1916 |
| 1,389,336 | Wickersham | Aug. 30, 1921 |
| 1,969,486 | Kurz | Aug. 7, 1934 |
| 2,046,125 | Lacy | June 30, 1936 |
| 2,046,710 | Umstott | July 7, 1936 |
| 2,061,409 | Spindler | Nov. 17, 1936 |
| 2,076,096 | Samuels et al. | Apr. 16, 1937 |
| 2,213,723 | Smith | Sept. 3, 1940 |
| 2,233,485 | Park | Mar. 4, 1941 |
| 2,690,853 | Kircher | Oct. 5, 1954 |
| 2,798,143 | O'Brien | July 2, 1957 |
| 2,829,583 | Leonard | Apr. 8, 1958 |
| 2,916,599 | Stiles | Dec. 8, 1959 |

FOREIGN PATENTS

| | | |
|---|---|---|
| 663,730 | France | Apr. 15, 1929 |
| 424,247 | Great Britain | Dec. 31, 1935 |
| 204,091 | Australia | Sept. 20, 1956 |